United States Patent

Knieriemen

[11] 3,984,063
[45] Oct. 5, 1976

[54] SEAT BELT RETRACTOR WITH ASSIST SPRING

[75] Inventor: John F. Knieriemen, St. Clair Shores, Mich.

[73] Assignee: General Motors Corporation, Detroit, Mich.

[22] Filed: Oct. 24, 1975

[21] Appl. No.: 625,641

[52] U.S. Cl. .................................. 242/107; 185/9; 242/107.4 R
[51] Int. Cl.² .................. A62B 35/00; B65H 75/48; F03G 1/00
[58] Field of Search ....................... 242/107–107.7; 185/9–14, 37, 39

[56] References Cited
UNITED STATES PATENTS

| | | | |
|---|---|---|---|
| 703,373 | 7/1902 | Bender | 185/9 |
| 2,131,223 | 9/1938 | Earll | 242/107 |
| 3,007,653 | 11/1961 | Becker | 242/107.5 |
| 3,040,139 | 6/1962 | Appleton | 185/9 X |
| 3,337,155 | 8/1967 | Binding | 242/107 |

Primary Examiner—Stanley N. Gilreath
Assistant Examiner—John M. Jillions
Attorney, Agent, or Firm—C. E. Leahy

[57] ABSTRACT

A seat belt retractor has a primary winding spring which is wound up during belt unwinding reel rotation to store energy for biasing the reel in the belt winding direction. An assist spring acts between the reel and an assist spring housing which is mounted for rotation relative both the retractor housing and the reel. A lock lever is pivotally mounted on the assist spring housing and is movable to a first position connecting the assist spring housing with the retractor housing so that the assist spring is wound up during belt unwinding reel rotation to store energy for biasing the reel in the belt winding direction and a second position connecting the assist spring housing with the reel so that the assist spring is maintained at its then existing state of wind up and has no biasing affect on the reel. A lock operating mechanism is provided which senses the extent of belt unwinding and moves the locking lever between the first and second positions in response to the extent of belt unwinding so that during belt unwinding within a predetermined range relative the limit of belt winding, the lock lever is in the first position to effect wind up of the assist spring and assist the primary spring in biasing the reel in the belt winding direction. The lock lever is moved to the second position upon belt unwinding beyond the predetermined range so that the assist spring is maintained at its then existing state of wind up with no biasing affect on the reel.

3 Claims, 6 Drawing Figures

SEAT BELT RETRACTOR WITH ASSIST SPRING

The invention relates to a seat belt retractor having a winding spring and more particularly provides an assist spring which is effective only during a final predetermined range of belt winding to provide an additional spring biasing effort on the seat belt reel.

It is known to provide a seat belt retractor wherein a winding spring biases a belt reel in the direction to wind the belt on the reel. The winding spring is conventionally a spiral or clock spring having one end mounted on the reel and the other end mounted on the retractor housing. As the reel is rotated in the belt unwinding direction by belt extension, energy is stored in the spring for biasing the reel in the belt winding direction.

It is characteristic of the aforedescribed conventional seat belt retractor that when the belt is fully unwound and engaged in restraining position about the seated occupant, the winding spring is fully wound up and provides its highest level of winding bias on the reel. This occurs because as the belt is unwound from its fully wound condition, the winding spring is increasingly wound up so that while it initially provides a relatively smaller biasing effort on the reel it proceeds to a tightly wound condition wherein a relatively higher biasing effort is provided.

It is known that a relatively high biasing effort on a seat belt tensions the belt against the occupant and can be annoying to the restrained occupant. It would therefore be desirable to provide a winding spring which imparts a relatively modest winding bias on the reel when the belt is unwound to the restraining position so that the belt is not uncomfortably tensioned across the body of the seated occupant. It has been found that a winding spring having this desired characteristic is not sufficient in strength to completely wind the seat belt on the reel and fully retract the belt system from its restraining position.

It is an object of the present invention to provide a seat belt retractor having both a primary spring and an assist spring with the assist spring being effective during a predetermined range of belt winding to provide a winding bias on the reel in addition to that of the primary spring.

A seat belt retractor according to the invention has a belt reel rotatably supported on a housing with a primary winding spring acting between the reel and the housing so that the primary winding spring is wound up during belt unwinding reel rotation to store energy for biasing the reel in the belt winding direction. An assist spring has one end connected to the reel and the other end connected to an assist spring housing which is mounted for rotation relative both the housing and the reel. A lock lever is pivotally mounted on the assist spring housing and is movable to a first position wherein it engages the housing to prevent rotation of the assist spring housing relative the reel housing so that the assist spring is wound up and energy is stored therein during belt unwinding reel rotation. The lock lever is movable to a second position connecting the assist spring housing with the reel so that the assist spring housing and the lock lever rotate in unison with the reel and the assist spring is thereby maintained at its then existing state of wind up with no biasing affect on the reel. A timing member in the form of a ring gear is rotatably mounted in the housing and is driven by a reduction gear and pinion so that the timing member rotates through less than one revolution relative the housing as the reel makes a plurality of revolutions between the limits of belt winding and belt unwinding. An actuating lever is pivotally mounted on the timing member and is engageable with the lock lever to move the lock lever between its first and second positions. A projection on the actuating lever rides in a cam slot on the housing to control pivotal movement of the actuating lever so that during a predetermined number of belt unwinding revolutions of the reel from the limit of belt winding the actuating lever maintains the lock lever in its first position connecting the assist spring housing with the reel housing to wind up the assist spring. During further unwinding revolutions beyond the predetermined number the cam slot pivots the actuating lever to move the lock lever to the second position so that the tension of the assist spring is maintained at its then existing state as the assist spring housing rotates with the reel. During belt winding reel rotation which returns the belt to within the predetermined number of revolutions of the reel from the limit of belt winding, the cam slot pivots the actuating lever to restore the lock lever to the first position so that the assist spring provides a winding bias on the reel to assist the winding spring in effecting completion of winding of the belt on the reel and retraction of the belt system to the unrestraining position.

One feature of the invention is the provision of an assist spring effective to provide additional spring force for completing retraction of the belt.

Another feature of the invention is the provision of a belt reel assist spring having one end connected to the reel and the other end selectively connected to either the retractor housing or the reel so that the spring has a biasing influence on the reel when the other end is connected to the retractor housing and so that energy stored in the spring has no biasing influence on the reel when the other end is connected to the reel.

Another feature of the invention is the provision of a lock selectively actuatable to connect a spring with either a retractor housing or a retractor reel and an operator for actuating the lock in response to the extent of belt winding and unwinding.

These and other objects, features and advantages of the invention will become apparent upon consideration of the appended specification and the drawings in which.

Figure 1:
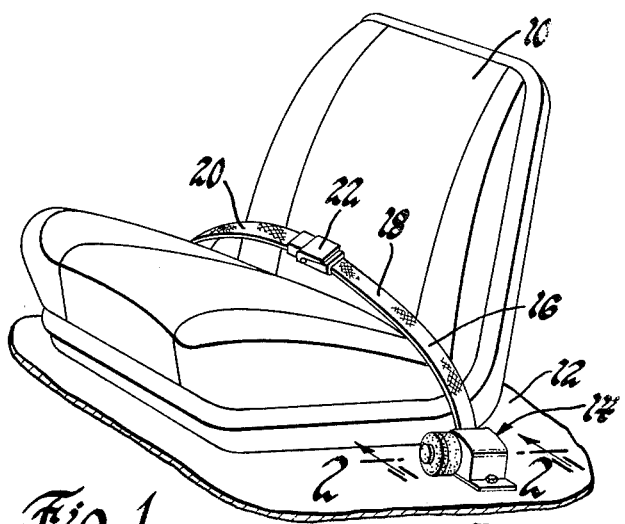
FIG. 1 is a perspective view of a vehicle seat employing a seat belt retractor according to the invention.

Referring to FIG. 1, a conventional vehicle seat 10 is mounted on the floor 12 of a vehicle body. A seat belt retractor, indicated generally at 14, is attached to the floor 12. The retractor 14 receives the end of a seat belt 16 and functions to wind and unwind the belt 16. FIG. 1 shows the belt 16 in restraining position across the lap of an occupant of the seat. When the belt 16 is in the restraining position, its free end 18 is connected to the vehicle floor by a belt 20 and a conventional seat belt buckle 22. When the set belt buckle 22 is disengaged, the retractor 14 winds the belt 16 to a stored position.

Figure 2:
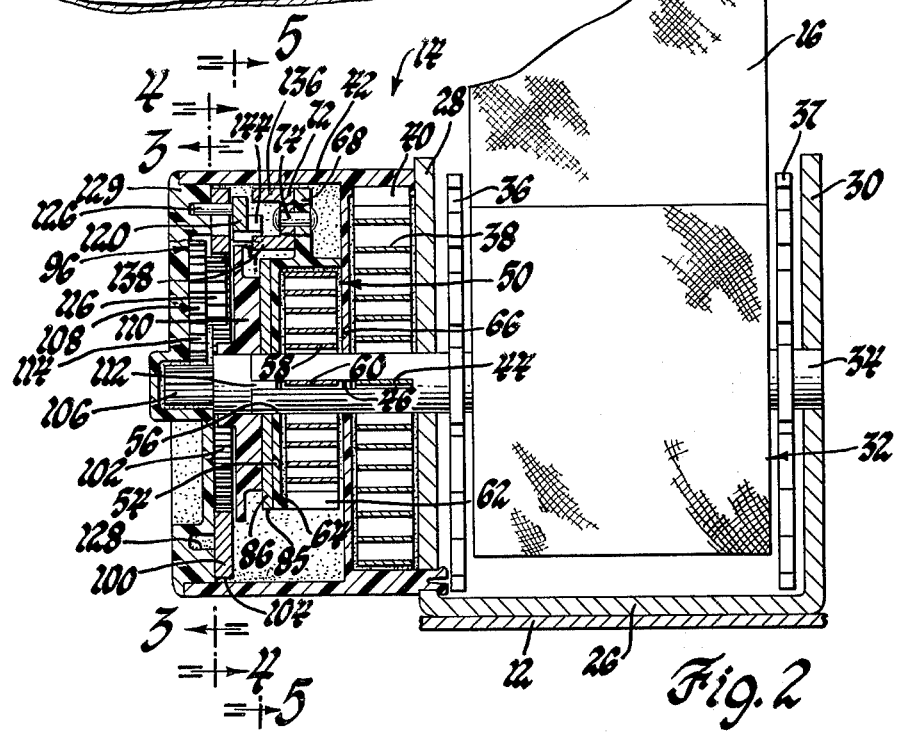
FIG. 2 is a side elevation sectional view of the seat belt retractor taken in the direction of arrows 2—2 of FIG. 1.

Referring to FIG. 2, the retractor 14 includes a bracket 26 which is attached to the floor 12 and has upstanding legs 28 and 30 which rotatably mount a reel shaft 34 of a seat belt reel indicated generally at 32. The end of the seat belt 16 is attached to the reel shaft 34 so that rotation of the reel shaft 34 effects winding and unwinding of the belt 16. Ratchet plates 36 and 37 are connected to the reel shaft 34 for rotation therewith and have ratchet teeth which are selectively engageable by a conventional locking mechanism, not shown.

A primary winding spring 38 is a spiral or clock type spring with its outer end 40 connected to a spring housing 42 and its inner end 44 extending into a slot 46 in the reel shaft 34. When the seat belt 16 is unwound from its fully wound position on the reel shaft 34, the inner end 44 of the primary winding spring 38 is rotated so that the primary winding spring 38 is wound up and energy is stored therein. The energy stored in the primary winding spring 38 provides biasing effort on the reel shaft 34. As belt unwinding progresses, the energy stored in the primary winding spring 38 increases progressively so that when the belt is fully unwound to its occupant restraining position of FIG. 1, the winding bias provided by the primary winding spring 38 is at its highest level. The primary winding spring 38 is selected to provide a relatively modest winding bias on the reel when the belt is fully unwound to the restraining position so that the belt is not uncomfortably tensioned across the body of the seated occupant.

Figure 5:
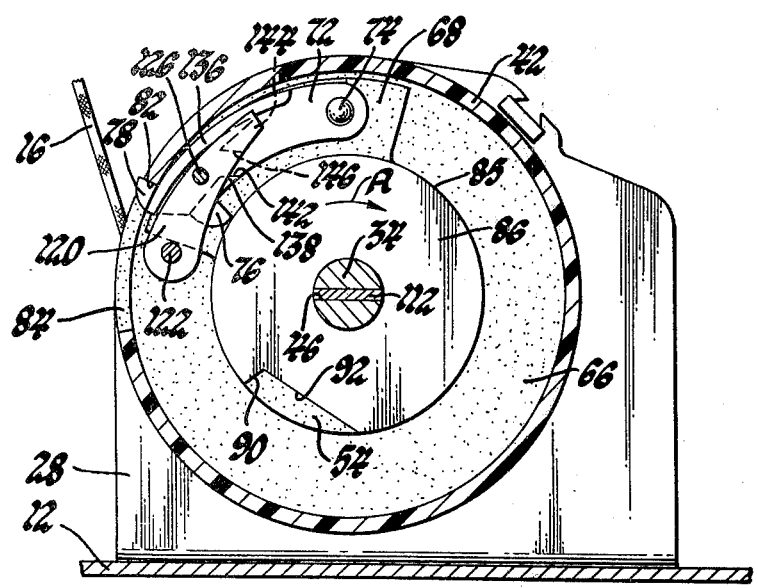
FIG. 5 is a sectional view taken in the direction of arrows 5—5 FIG. 2 and showing the belt fully wound on the reel.

An assist spring mechanism indicated generally at 50 is provided to selectively assist the primary winding spring 38 in providing a winding bias on the seat belt reel 32. As best seen in FIGS. 2 and 5, an assist spring housing 54 is generally cup-shaped and has a central aperture 56 which receives the end of reel shaft 34 so as to mount the assist spring housing 54 for rotation relative both the reel shaft 34 and the spring housing 42. An assist spring 58 is housed within the assist spring housing 54 and has its inner end 60 engaged in the slot 46 of the reel shaft 34 and its outer end 62 attached to the assist spring housing 54 by engagement in a slot 64. A wall 66 of the spring housing 42 extends between the primary winding spring 38 and the assist spring 58 so as to isolate the springs against entanglement with one another. The assist spring housing 54 has a radial projection 68.

Referring to FIGS. 2 and 5, a lock lever 72 is pivotally connected to a radial projection 68 of the assist spring housing 54 by a rivet 74. As best seen in FIG. 5, the lock lever 72 has an inwardly facing pawl tooth 76 and an outwardly facing pawl tooth 78 at its free end. FIG. 5 shows a first or normal position of the lock lever 72 wherein the outwardly facing pawl tooth 78 is engaged against a shoulder 82 which is defined by a slot 84 in the spring housing 42. When the lock lever 72 is in this normal or first position, the inwardly facing pawl tooth 76 is poised above the outer peripheral surface 85 of a lock disc 86 which is splined or otherwise fixed for rotation with the reel shaft 34 of the seat belt reel 32. When the lock lever is in this first position of FIG. 5 the lock lever 72 functions to connect the assist spring housing 54 to the spring housing 42 so that the assist spring housing 54 cannot rotate relative the reel shaft 34. Accordingly, as the seat belt 16 is unwound from the seat belt reel 32 the assist spring 58 is wound tighter and tighter to store energy therein and also provides a progressively increasing biasing action tending to rotate the seat belt reel 32 in the belt winding direction.

Figure 6:
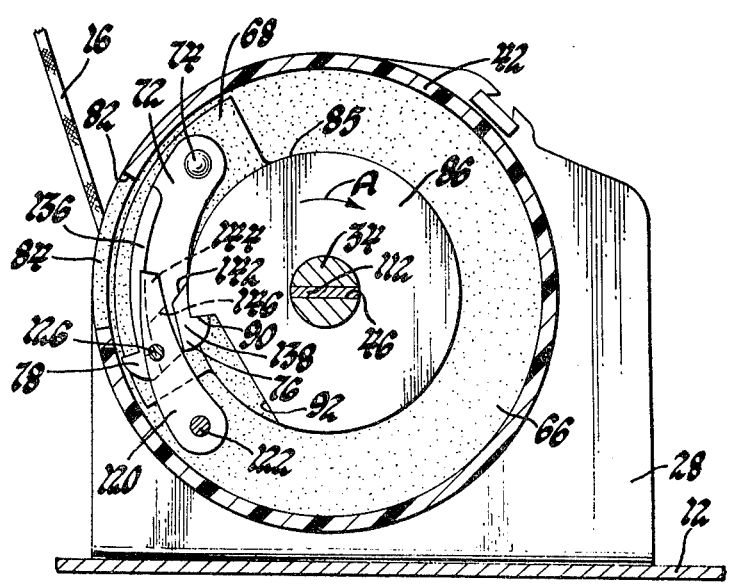
FIG. 6 is a view similar to FIG. 5 but showing the belt somewhat unwound from the reel.

The lock lever 72 also has a second position as shown in FIG. 6 wherein the lock lever 72 is pivoted inwardly about the rivet 74 so that the inwardly facing pawl tooth 76 is engaged over a shoulder 90 which is defined by a slot 92 in the pepripheral surface 85 of the lock disc 86. When the lock lever 72 is in this second position, the lock lever 72 functions to connect the assist spring housing 54 with the seat belt reel 32 for rotation therewith so that the tension in the spring 58 is maintained at its then existing state and the assist spring 58 has no biasing affect on the seat belt reel 32.

Figure 4:
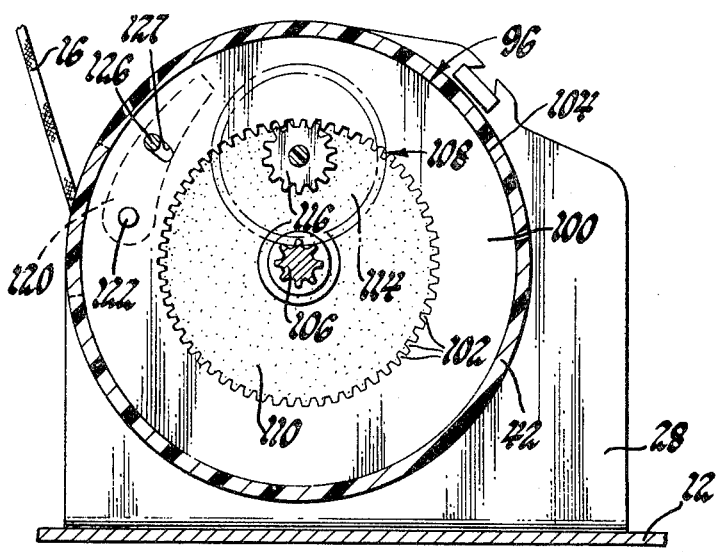
FIG. 4 is a sectional view taken in the direction of arrows 4—4 of FIG. 2.

A timing mechanism generally indicated at 96 functions to move the lock lever 72 between its first position of FIG. 5 and the second position of FIG. 6. The timing mechanism 96 includes an annular ring gear 100 which has gear teeth 102 on its inner surface. The outer surface 104 of the ring gear 100 is slidably engaged with the spring housing 42 to mount the ring gear 100 for rotation relative the housing. The ring gear 100 is rotated upon rotation of the seat belt reel 32 through a pinion 106 and a reduction gear 108, which are best seen in FIGS. 2 and 4. The pinion 106 has a projection 112 which extends into the open end of the slot 46 in the reel shaft 34 so that the pinion 106 is rotated in unison with the seat belt reel 32. A spacing disc 110 is provided between the gears and the lock disc 86. The pinion 106 meshes with a larger diameter portion 114 of the reduction gear 108 while a smaller diameter portion 116 of the reduction gear 108 meshes with the gear teeth 102 of the ring gear 100. Accordingly, as best understood by reference to FIG. 4, clockwise rotation of the pinion 106 as the belt is unwound from the seat belt reel 32 causes the reduction gear 108 to rotate in the counterclockwise direction which in turn causes the ring gear 100 to rotate in the counterclockwise direction. The direction of each element of this gear train is of course reversed in direction of rotation when the belt is being wound on the reel. The ratio of the various gears of the gear train is chosen so that when the pinion 106 and seat belt reel 32 make several revolutions between the limit of fully wound and fully unwound belt condition the ring gear 100 will be rotated through less than one complete revolution. Furthermore, it will be understood that the ring gear 100 always rotates in the opposite direction from the direction of rotation of the seat belt reel 32 and the pinion 106.

Figure 3:
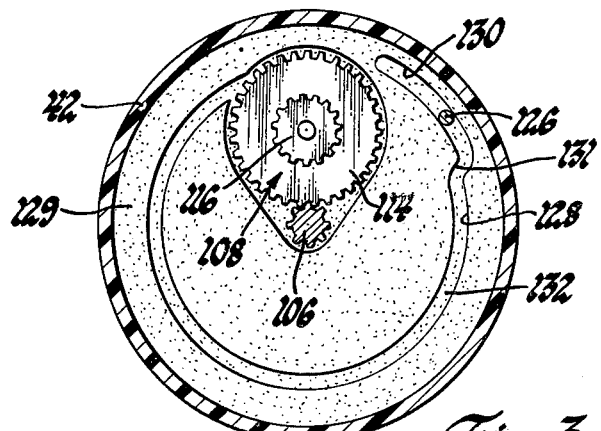
FIG. 3 is a sectional view taken in the direction of arrows 3—3 of FIG. 2.

Referring to FIGS. 4 and 5, an actuating lever 120 is pivotally connected to the ring gear 100 by a rivet 122. As best seen in FIG. 2, the actuating lever 120 has an integral projection 126 which extends through a clearance opening 127 in the ring gear 100 and rides in a cam slot 128 which is provided in the end cover 129 of the spring housing 42. As best seen in FIG. 3, the cam slot 128 has a larger diameter dwell portion 130 and a riser portion 131 which leads to a smaller diameter dwell portion 132. Thus, as the ring gear 100 rotates relative the housing, the projection 126 rides along the cam slot 128 and controls pivotal movement of the actuating lever 120 as the ring gear 100 and actuating lever 120 rotate relative the housing end cover 129.

The pivotal movement of the actuating lever 120 controls pivotal movement of the lock lever 72 between its first and second position. As best seen in FIGS. 2 and 5, the free end of the lock lever 72 has a channel cross section defined by an outer wall 136 and an inner wall 138. The end of inner wall 138 is rounded to provide a cam surface 142. The actuating lever 120 has a laterally extending projection 144 which extends between the walls 136 and 138 of the lock lever 72. The projection 144 has a cam surface 146. The projection 144 of the actuating lever 120 coacts with the walls 136 and 138 of the lock lever 72 as will be described hereinafter.

SUMMARY OF THE OPERATION

Referring to FIGS. 2 and 5, the various elements of the seat belt retractor 14 are shown with the seat belt 16 fully wound on the belt reel 32. When the seat occupant unwinds the belt 16, the primary winding spring 38 which has its outer end 40 connected to the spring housing 42 and its inner end 44 connected to the reel shaft 34 is wound up. Simultaneously, the assist spring 58 is also wound up because its inner end 60 is connected to the reel shaft 34 and its outer end 62 is connected to the spring housing 42 via the assist spring housing 54 and the engagement of the outward facing pawl tooth 78 of lock lever 72 with the shoulder 82 on the spring housing 42. As the belt 16 is progressively unwound the primary winding spring 38 and the assist spring 58 are progressively wound up and provide and increasing biasing effort on the reel in opposition to the belt extending force applied thereto by the seat occupant.

As the belt 16 is being unwound, the assist spring housing 54 and the lock lever 72 rotates in unison with the seat belt reel 32 in the direction of arrow A of FIG. 5. Simultaneously, the actuating lever 120 which is pivotally connected to the ring gear 100 by rivet 122 rotates in the direction opposite to arrow A. As belt unwinding progresses, the ring gear 100 rotates much slower than the seat belt reel 32. The riser portion 131 of the cam slot 128 is positioned so that the projection 126 of the actuating lever 120 arrives at the riser portion 131 of the cam slot 128 at the predetermined number of revolutions at which the assist spring 58 approaches its fully wound condition. Further unwinding movement of the reel and the consequent rotation of the ring gear 100 causes the projection 126 to traverse the riser portion 131 of the cam slot 128 thereby pivoting the actuating lever 120 radially inwardly from its position of FIG. 5 to its position of FIG. 6. This radial inward pivoting of the actuating lever 120 brings the laterally extending projection 144 and cam surface 146 thereof into radial alignment with the cam surface 142 of the inner wall 138 of the lock lever 72. Accordingly, when the opposite rotations of the lock lever 72 and actuating lever 120 bring their cam surfaces 142 and 146 into engagement, the lock lever 72 is pivoted inwardly bringing the inwardly facing lock pawl 76 into engagement of the shoulder 90 of the lock disc 86. The gear train connection between the seat belt reel 32 and the actuating lever 120 synchronizes their rotation so that the shoulder 90 of the lock disc is properly aligned for engagement by the inwardly facing lock pawl. Engagement of the inwardly facing pawl tooth 76 with the shoulder 90 of the lock disc 86 allows the lock lever 72 and the assist spring housing 54 to rotate in unison with the seat belt reel 32 so that the assist spring 58 does not urge the seat belt reel 32 in the belt winding direction and the winding energy is stored in the assist spring 58. Thus, when the belt is fully extended to its restraining position of FIG. 1, the primary winding spring 38 exerts a winding force on the belt while the winding force of the wound up assist spring 58 has no biasing affect on the reel.

When the seat belt buckle 22 is disengaged, belt winding reel rotation is induced by the force of the primary winding spring 38. As this belt winding reel rotation progresses, the ring gear 100 and actuating lever 120 rotate in the direction of arrow A while the seat belt reel 32, assist spring housing 54 and lock lever 72 rotate in the direction opposite to arrow A. As belt winding proceeds, the primary winding spring 38 is gradually unwound and it provides a progressively decreasing winding bias on the seat belt reel 32. The ring gear 100 carries the actuating lever 120 along the smaller diameter portion 132 of the cam slot 128. When the projection 126 of the actuating lever 120 traverses the riser portion 131 of the cam slot 128, the actuating lever 120 is moved radially outwardly from its position of FIG. 6 to its position of FIG. 5. The relative rotational position of the actuating lever 120 and the lock lever 72 are synchronized by the gears so that the laterally extending projection 144 of the actuating lever 120 is aligned with and brought into engagement with the outer wall 136 of the lock lever 72 as the projection 126 traverses the riser portion 131. Accordingly, the lock lever 72 is pivoted outwardly about the rivet 74 to move the outward facing pawl tooth 78 into the slot 84 of the spring housing 42 and into engagement with the shoulder 82 thereof. Lock lever 72 is maintained in the first position of FIG. 5 by the engagement of projection 144 of the actuating lever 120 with the wall 136 of lock lever 72. Restoration of the lock lever to the first position of FIG. 5 again connects the outer end of assist spring 58 to the spring housing so that the assist spring 58 biases the seat belt reel 32 in the belt winding direction. Thus, during the final predetermined number of winding revolutions of the seat belt reel, the energy stored in the assist spring 58 assists the remaining energy of the primary winding spring 38 to effect completion of the winding rotation of the seat belt reel 32.

It will be understood that the positioning of the riser portion 131 along the length of the cam slot 128 determines the range of belt unwinding during which both the primary spring and the assist spring have a biasing effect on the seat belt reel. It will also be understood that additional riser portions could be provided in the cam slot in order to operate the actuating lever 120 more than once during a single belt extension or retraction so that any desired range of reel rotation may be selected during which the assist spring is effective to assist the primary spring in baising the belt reel in the winding direction.

Thus, it is seen that the invention provides a seat belt retractor having a primary winding spring which is continuously effective to provide a winding bias on the belt reel and also an assist spring which provides a winding bias on the reel only during a predetermined range of reel revolutions.

What is claimed is:

1. In a vehicle occupant restraint belt retractor having a belt reel member rotatably supported on a housing member, and a belt wound and unwound by rotation of the reel between a limit of belt winding and belt unwinding; a spring mechanism for biasing the reel in the belt winding direction of rotation and comprising:

a primary winding spring acting between the reel member and the housing member and being wound up during belt unwinding reel rotation to store energy for biasing the reel member in the belt winding direction, an assist spring having a first end and a second end, the first end of the assist spring being attached to one of the members, lock means carried by the second end of the assist spring and selectively actuatable between a first position connecting the second end of the assist spring with the other member so that the assist spring is wound up during belt unwinding reel rotation to store energy for biasing the reel member in the belt winding direction and a second position connecting the second end of the assist spring with the one member so that the assist spring is maintained at its then existing state of winding and has no biasing affect on the reel member, and lock opeprating means being effective to sense the extent of belt unwinding to move the lock means between the first and second positions in response to the extent of belt unwinding so that during belt unwinding within a predetermined range the lock lever is in the first position to effect wind up of the assist spring and assist the primary spring in biasing the reel member in the belt winding direction of rotation and the lock lever is in the second position during belt winding and unwinding not within the predetermined range so that the assist spring is maintained at its then existing state of winding with no biasing affect on the reel member.

2. In a vehicle occupant restraint belt retractor having a belt reel rotatably supported on a housing, and a belt wound and unwound between a limit of belt winding and a limit of belt unwinding during rotation of the reel, a spring mechanism for biasing the reel in the belt winding direction of rotation comprising:

a primary winding spring acting between the reel and the housing and being wound up during belt unwinding reel rotation to store energy for biasing the reel in the belt winding direction, an assist spring housing mounted for rotation relative the housing and the reel, an assist spring acting between the reel and the assist spring housing, locking means carried by the assist spring housing and selectively actuatable between a first position connecting the assist spring housing with the housing so that the assist spring is wound up during belt unwinding reel rotation to store energy for biasing the reel in the belt winding direction and a second position connecting the assist spring housing with the reel so that the assist spring is maintatined at its then existing state of winding and has no biasing affect on the reel, and lock operating means being effective to sense the extent of belt unwinding to move the locking lever between the first and second positions in response to the extent of belt unwinding so that during belt unwinding within a predetermined range relative the limit of belt winding the lock lever is in the first position to effect wind up of the assist spring and assist the primary spring in biasing the reel in the belt winding direction of rotation and the lock lever is in the second position during belt winding and unwinding not within the predetermined range so that the assist spring is maintained at its then existing state of winding with no biasing affect on the reel.

3. In a vehicle occupant restraint belt retractor having a belt reel rotatably supported on a housing, and a belt wound and unwound by rotation of the reel between a limit of belt winding and belt unwinding, a spring mechanism for biasing the reel in the belt winding direction of rotation comprising:

a winding spring having one end attached to the reel and the other end attached to the housing and being wound up during unwinding reel rotation to store energy for biasing the reel in the winding direction, an assist spring housing mounted for rotation relative the housing and the reel, an assist spring having one end connected to the reel and the other end connected to the assist spring housing, a lock lever pivotally mounted on the assist spring housing for movement between a first position engaging the housing to effect wind up and storage of energy in the assist spring during unwinding reel rotation and causes the assist spring to bias the reel in the winding direction and a second position connecting the assist spring housing with the reel so that the assist spring housing and the lock lever rotate in unison with the reel and the assist spring is maintained at its then existing state of winding with no biasing affect on the reel, a timing member rotatably mounted in the housing, drive means acting between the reel and the timing member and effective to rotate the timing member through less than one revolution relative the housing as the reel makes a plurality of revolutions between the limits of belt winding and belt unwinding, an actuating lever pivotally mounted on the timing member and being engageable with the lock lever to effect movement of the lock lever between its first and second positions, and a cam means on the housing cooperable with the actuating lever for controlling pivotal movement of the actuating lever so that during a predetermined number of belt unwinding revolutions of the reel from the limit of belt winding the lock lever is maintained in its first position connecting the assist spring housing with the reel housing to wind up the assist spring and then during further unwinding revolutions beyond the predetermined number the actuating lever moves the lock lever to the second position so that the tension of the assist spring is maintained at its then existing state by causing the assist spring housing to rotate with the reel, said cam means being further effective to restore the lock lever to the first position upon belt winding reel rotation to within the predetermined number of revolutions of the reel from the limit of belt winding so that the assist spring provides a winding bias on the reel to assist the winding spring in effecting completion of winding of the belt on the reel.

* * * * *